Dec. 3, 1968 H. R. ALLEN, JR 3,414,895

MAGNETIC HEAD WITH MEANS FOR ASSURING FIRM TAPE-HEAD CONTACT

Filed Jan. 14, 1966

INVENTOR.
HARRY R. ALLEN, JR.

BY M. Michael Carpenter

ATTORNEY.

United States Patent Office 3,414,895
Patented Dec. 3, 1968

3,414,895
MAGNETIC HEAD WITH MEANS FOR ASSURING FIRM TAPE-HEAD CONTACT

Harry R. Allen, Jr., Littleton, Colo., assignor to Honeywell Inc., Minneapolis, Minn., a corporation of Delaware Filed Jan. 14, 1966, Ser. No. 520,609
4 Claims. (Cl. 340—174.1)

The present invention relates to an improved electromagnetic transducer and more particularly to an improved magnetic head.

In high speed magnetic record/reproduce systems the motion of a record media across a magnetic head entrains a thin laminar layer of air which is undesirable because it causes an unwanted separation therebetween. This decreases the voltage generated by the magnetic head during the reproduce mode and also decreases the magnetization of the record media during the record mode. The contact between the magnetic head and the record media can be improved through various arrangements for removing the entrained layers of air which in practice may be of the order of a thousandth of an inch or less. One way to reduce these entrained air layers would be to operate the area around the magnetic head at a negative pressure, ideally at a vacuum. Another approach for removing the unwanted thin laminar layer of air is disclosed in my patent application Ser. No. 487,271, filed Sept. 14, 1965, and assigned to the common assignee. That arrangement removes the unwanted laminar air layer by creating a scraping edge against the surface of the record media, prior to its contact with the magnetic head, for removing the air layer therefrom and thereby preventing the air layer from separating the record media from the magnetic head. It has been found that the laminar layer of air entrained between the record media and the magnetic head, which produces separation or "lift-off" therebetween, also produces an undulating disturbance of the record media as it leaves the area of the magnetic head. This disturbance takes the form of undesired generated waves or ripples which occur just past the area of lift-off.

Accordingly, one object of the present invention is to provide a simple and efficient means for improving the surface contact between a magnetic head and a record media.

Another object of the instant invention is to provide a means for eliminating the effect of an entrained layer of air from between a magnetic head and a record media being conveyed over the head.

Still another object of this invention is to provide a means for allowing an entrained layer of laminar air to pass between a magnetic head and its associated record media without affecting the electromagnetic relationship therebetween.

A further object of the present invention is to provide a means for utilizing the entrained laminar layer of air between a magnetic head and its associated record media to improve the surface contact therebetween.

Other objects and many of the attendant advantages of the present invention will become better understood to those skilled in the art when considered in light of the subsequent detailed specification and drawings, wherein.

Figures 1, 2, 3, 4, 5:
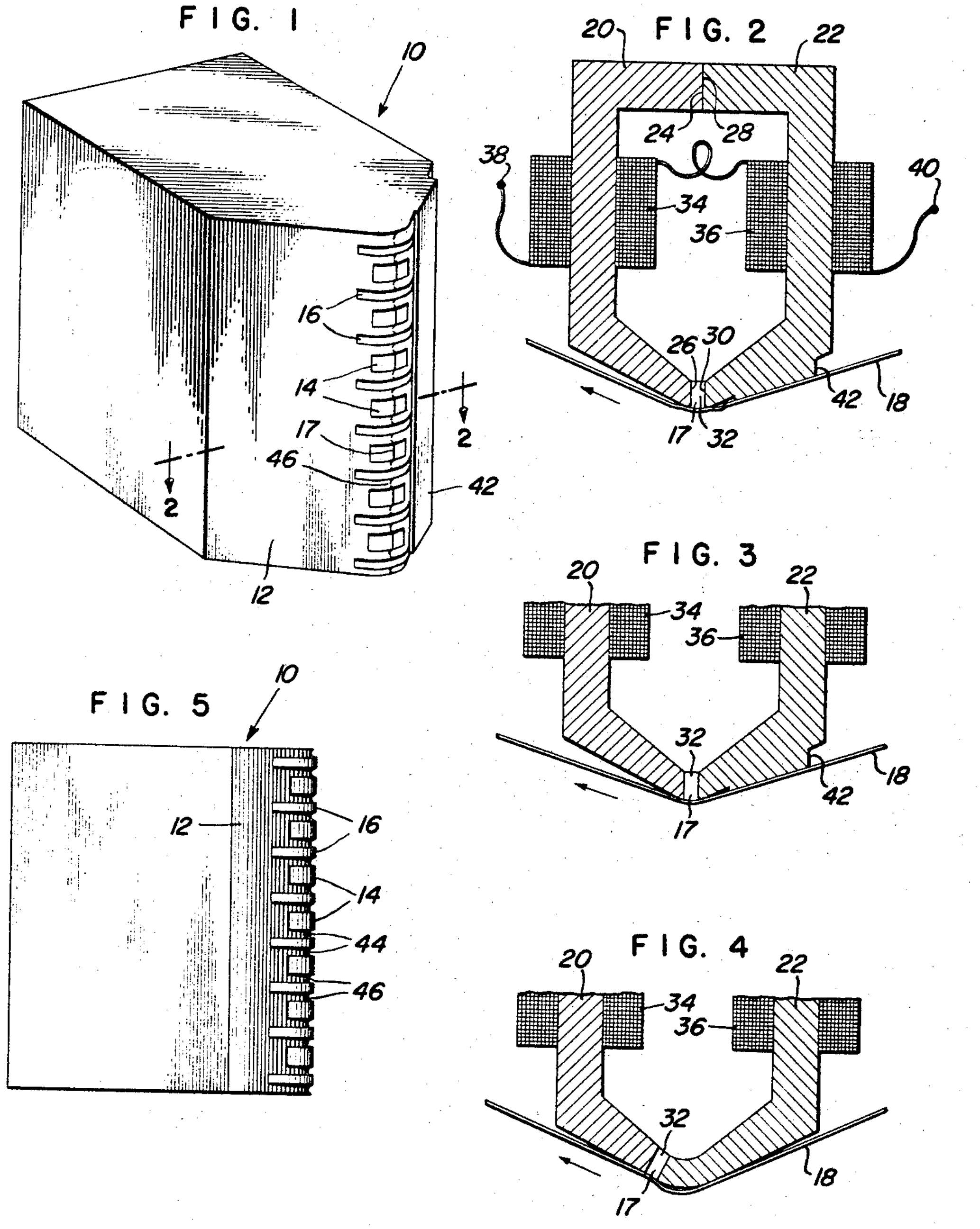
FIG. 1 is a perspective view showing a magnetic head embodying the novel invention.
FIG. 2 is a sectional view taken along line 2—2 of FIG. 1 showing a record media passing over the magnetic head at a high speed.
FIG. 3 is a fragmentary sectional view, similar to FIG. 2, showing the record media passing over the magnetic head at a low speed.
FIG. 4 is a fragmentary sectional view showing a variation of the present invention.
FIG. 5 is a side elevation of a magnetic head embodying the present invention.

Referring to FIG. 1 in more detail, there is shown a novel magnetic head 10 having a supporting surface 12, including track elements 14 and shield elements 16, for contacting a record media 18, FIG. 2, such as magnetic tape. The magnetic head 10 may be one of several configurations such as a record/reproduce head, record head, playback head, or erase head each including a supporting surface 12 and track elements 14 having a recording gap 17 therein, to be described hereinafter. It should be noted that the reference to a recording gap herein is intended to be generic to all types of such magnetic heads. The configuration of the magnetic head 10 is comprised of laminated layers of alternating track and shield elements, 14 and 16. Each track element 14 includes a separate electromagnetic circuit for propagating an electromagnetic signal to the magnetic tape 18. As seen in FIG. 2, each track element 14 includes a pair of U-shaped core pieces 20 and 22. The U-shaped core pieces are provided with plane end faces oppositely arranged in confronting relationship between each core piece 20 and 22. Thus, core piece 20 is provided with end faces 24 and 26 arranged to mate with end faces 28 and 30 on core piece 22, respectively. Confronting end faces 24 and 28 are arranged to form a back gap for magnetic flux in the core pieces 20 and 22 while the remaining end faces 26 and 30 are arranged to form a front recording gap 17. A nonmagnetic gap spacer 32 is provided in the recording gap 17 to effect a recording operation in a conventional manner. The core pieces 20 and 22 are energized by a pair of series-connected input coils 34 and 36 wound in a toroid arrangement around each core piece. The coils are effective to induce a magnetic flux in the core pieces 20 and 22 and the recording gap 17 in response to an input signal applied to coil input terminals 38 and 40.

The magnetic tape 18 is conveyed across the supporting surface 12 of the magnetic head 10 by conventional tape transport means, not shown. As the magnetic tape 18 moves from right to left, FIGS. 2 and 3, across the supporting surface 12 of the magnetic head 10 an entrained layer of laminar air is drawn therebetween by the high speed motion of the tape 18. This layer of air causes the tape to lift-off the recording gap, in the order of a thousandth of an inch or less, thus decreasing the record or reproduce signals therebetween. As the magnetic tape 18 and its associated entrained layer of air pass over the recording gap 17 the tension reacting on the tape causes the compression of the thin air layer therebetween which undergoes expansion beyond the recording gap, thus creating undesirable disturbances in the form of undulatory ripples generated therein. It has been found that the ripples, caused by the expanding entrained air between the magnetic tape and the magnetic head, create a point beyond the recording gap where the magnetic tape firmly contacts the supporting surface of the magnetic head.

An embodiment of the present invention utilizing the principle described hereinabove to advantage is shown in FIG. 4. The recording gap 17, located within the magnetic head, is off-set and established at the point of tape contact beyond the area of tape lift-off thereby providing a substantially improved contact between the recording gap 17 and the magnetic tape. This application is suitable for a unispeed tape transport but, where a multispeed arrangement is desired, the application becomes unsuitable due to the variation of the point of tape contact. Further, at lower tape speeds the lift-off phenomenon does not occur thereby allowing the tape to contact the supporting surface at its center portion and thereafter separate from the supporting surface before contacting the off-centered recording gap. The absence of tape lift-off at low speeds renders the use of an off-centered recording gap applicable only for a tape transport having a single high tape speed.

In order to remove the effect of the entrained layer of air from between the magnetic tape 18 and the recording gap 17 and provide improved contact therebetween, within multispeed tape transports, the supporting surface 12 of the magnetic head 10 is provided with a flat wedged shaped portion 42 extending therebeyond. The flat portion 42 is attached, as by bonding, to the supporting surface 12 perpendicular to the motion of the magnetic tape 18 conveyed thereby and located in spaced relationship parallel to and in juxtaposition with the recording gap 17. The flat portion 42 may also be fabricated as an extending portion of the core piece 22.

Referring to FIG. 2, the flat portion 42 is so arranged that a layer of air entrained by the magnetic tape 18 at high speeds, such as 120 i.p.s. and above, causes an exaggerated lift-off therefrom between one and two thousandth of an inch. The tape, after passing beyond said flat portion 42, is excited into undulatory motion by the exaggerated lift-off and thereafter urged against the recording gap 17 by the undulation, for improving the contact therebetween. Through proper selection of the dimensions of the flat portion 42 and due to the exaggeration of the undulatory motion caused thereby, the magnetic tape can be made to contact the recording gap over a wide range of elevated tape speeds. At lower tape speeds the magnetic tape 18 slides over the flat portion 42 and contacts the recording gap without undulation, due to the absence of the entrained air layer and its associated lift-off. This arrangement allows the tape 18 to contact the recording gap 17 at all tape speeds, regardless of the presence or absence of an air layer entrained therebetween.

FIG. 5 shows a further modification to the magnetic head 10. Here alternating layers of track elements 14 and shield elements 16, comprising the supporting surface 12, are shown to be separated by layers of nonmagnetic material 44. The nonmagnetic material 44 is relieved between each shield and track element in the form of a semicylindrical groove 46. Each groove 46 provides a relief area into which the laminar layer of entrained air may be displaced for further improving the contact of the magnetic tape 18 against the recording gap 17. The depth of each groove 46 is important since too small a depression will not provide enough relief for removing sufficient portions of entrained air and too large a depression will increase the wear of the magnetic tape passing thereover. It has been found that a depression of 40 to 100 microinches is a preferred dimension for the semicylindrical grooves.

Obviously many modifications and variations of the present invention are possible in light of the above teachings and the embodiment described hereinabove should be considered as an illustration rather than a limitation of the present invention, consequently, the present invention should be limited only by the attendant claims.

What is claimed is:

1. A magnetic head comprising, a core piece disposed for forming a gap therebetween, a spacer disposed within said gap for forming a supporting surface over which a record media is conveyed, coil means surrounding said core piece for creating a flux within said gap, and means associated with said supporting surface for exciting said conveyed record media into an undulatory motion urging said record media into firm contact with said supporting surface at the location of said gap.

2. A magnetic head as described in claim 1 wherein said means associated with said supporting surface include an off-centered gap within said supporting surface, said gap being located on said supporting surface at the point where said record media is urged by its natural undulation for firmly contacting said gap.

3. A magnetic head as described in claim 1 wherein said means associated with said supporting surface include a flat portion extending therebeyond in perpendicular relation with said conveyance of said record media and in juxtaposition with said gap for exciting said record media into said undulatory motion thereby urging said record media into firm contact with said supporting surface at the location of said gap.

4. A magnetic head as described in claim 1 wherein said supporting surface is formed by a plurality of said core pieces and said spacers alternately disposed in laminated arrangement having a plurality of shield means therebetween.

References Cited

UNITED STATES PATENTS

| | | | |
|---|---|---|---|
| 3,375,574 | 4/1968 | Woods et al. | 340—174.1 |
| 3,273,896 | 9/1966 | Meader | 179—100.2 |
| 2,678,972 | 5/1954 | Spears | 179—100.2 |

BERNARD KONICK, *Primary Examiner.*

A. I. NEUSTADT, *Assistant Examiner.*